(12) United States Patent
Reuss

(10) Patent No.: US 8,073,152 B1
(45) Date of Patent: Dec. 6, 2011

(54) AUTOMATED VOICE OVER INTERNET PROTOCOL WIRELESS HEADSET

(75) Inventor: Edward L. Reuss, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 985 days.

(21) Appl. No.: 11/451,816

(22) Filed: Jun. 12, 2006

(51) Int. Cl.
*H04R 1/10* (2006.01)
*H04R 21/02* (2006.01)
(52) U.S. Cl. .......................................... 381/74; 381/367
(58) Field of Classification Search ................... 381/74, 381/367; 370/338
See application file for complete search history.

(56) References Cited

U.S. PATENT DOCUMENTS

| | | | |
|---|---|---|---|
| 2003/0063043 A1* | 4/2003 | Girard | 345/8 |
| 2007/0049198 A1* | 3/2007 | Walsh et al. | 455/41.2 |
| 2007/0165875 A1* | 7/2007 | Rezvani et al. | 381/74 |

\* cited by examiner

*Primary Examiner* — Davetta W Goins
*Assistant Examiner* — Mohammad Islam
(74) *Attorney, Agent, or Firm* — David S. Park

(57) ABSTRACT

A system, apparatus, and method are provided for automatically provisioning wireless local area network (LAN) access point and/or hotspot information, Voice over Internet Protocol (VoIP) service provider information, and VoIP account information on a service provider's Web page to configure a wireless VoIP headset for use.

20 Claims, 3 Drawing Sheets

AUTOMATED VOICE OVER INTERNET PROTOCOL WIRELESS HEADSET

TECHNICAL FIELD

The present invention relates generally to wireless devices and, more particularly, to a system, apparatus, and method for use of a wireless Voice over Internet Protocol (VoIP) headset in a hotspot.

BACKGROUND

A wireless headset user wishing to make a call in a "hotspot", as are available in many hotels, convention centers, coffee shops, airport terminals, etc., needs to log in and be authorized to use the hotspot services. This procedure often involves billing the user's credit card for the service for some period of time, ranging from one hour of service to a recurrent service plan.

Once connected to the hotspot, the user must manually navigate to the user's VoIP provider web site and log into the user's VoIP account. However, the headset user may not have access to a display device and keyboard, such as a notebook personal computer, pocket PC, personal digital assistant (PDA), or a cellular telephone equipped with a wireless interface needed to navigate the login screens and enter the billing information.

Even if the user has such a device, once the login procedure is finished, some means of transferring the authorization from the display device to the wireless headset is required. It is presumed that incorporating a full keyboard and graphical user interface within a wireless headset is physically infeasible. Previous solutions have included the use of a corded headset or a Bluetooth wireless headset connected to a soft phone operating on a laptop computer, pocket PC, PDA, etc. All of these solutions have required an external device and the user to manually enter the various parameters into the fields by hand.

Thus, a system, apparatus, and method to automatically access a hotspot and login to a VoIP account to gain authorization for VoIP telephony is highly desirable.

SUMMARY

The present invention provides a system, apparatus, and method for automatically provisioning wireless local area network (LAN) access point and/or hotspot information, VoIP service provider information, and VoIP account information on a service provider's Web page to configure a wireless VoIP headset for use.

In one embodiment of the present invention, a VoIP headset is provided, the headset comprising a network interface for wirelessly communicating with an access point supporting a local area network (LAN) and a memory for storing access point information, VoIP service provider information, and VoIP account information. The headset further includes a World Wide Web (Web) browser for accessing a VoIP account via a VoIP service provider Web page.

In accordance with another embodiment of the present invention, a VoIP headset is provided, the headset comprising a network interface for wirelessly communicating with an access point (AP) supporting a local area network (LAN) allowing for connectivity to the Internet; a first memory for storing AP information including login information; a second memory for storing VoIP service provider information including service provider World Wide Web (Web) address; and a third memory for storing VoIP account information including a VoIP account identification and a password.

In accordance with yet another embodiment of the present invention, a method of automatically provisioning VoIP account information to configure a wireless VoIP headset for use is provided, the method comprising providing a wireless headset as described above; connecting to the AP using the access point information; connecting to a VoIP service provider Web page via the Web browser using the VoIP service provider information; and accessing a VoIP account via the VoIP service provider Web page using the VoIP account information.

Advantageously, the present invention permits a wireless headset to automatically connect and configure itself to a VoIP gateway whenever it detects either an open AP or an AP with a hotspot service provider that it recognizes. Thus, the present invention provides for a wireless VoIP headset to be connected and available to make and receive calls without manual intervention by the user or the use of a separate device to manage the connection setup.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

The present invention provides a system, apparatus, and method for connecting to an available access point (AP) or hotspot (either the AP or hotspot is open or stored login information in a wireless headset is used), and then connecting to a Voice over Internet Protocol (VoIP) service provider Web page via a Web browser. Stored information in the wireless headset can then access a VoIP account to place the wireless headset in the ready state to initiate or receive VoIP calls.

Advantageously, the present invention allows for improved service for wireless headsets. The wireless headset provider may provision AP/hotspot information into the device to set, for example, the following potential conditions: 1) list of known hotspot locations; 2) list of available hotspots (e.g., Sprint PCS, T-Mobile, etc.); 3) SSID, security, and other information for each network; 4) other information important for the device to select and login to hotspots; 5) VoIP service provider Web information; and 6) VoIP account information. This list is not meant to limit the present invention in any way.

An AP may be any device that allows wireless-equipped computers and other devices to communicate with a wired network. An AP may also be used to expand the range of a wireless network. In one example, an AP is able to support WiFi in general, and the 802.11a, 802.11b, and/or 802.11g wireless networking standards in particular. Examples of applicable APs for the present invention include but are not limited to the Wireless-B Access Point (Model WAP11), Wireless-G Access Point (Model WAP54G), and Dual-Band Wireless A+G Access Point (Model WAP55AG), available from Linksys, a division of Cisco Systems, Inc., of San Jose, Calif. In other examples, the AP may be able to support other wireless networking standards.

A hotspot may be a location with a high-speed Internet connection and wireless connectivity provided by one or more active wireless APs. A hotspot may be public or private.

Figure 1:
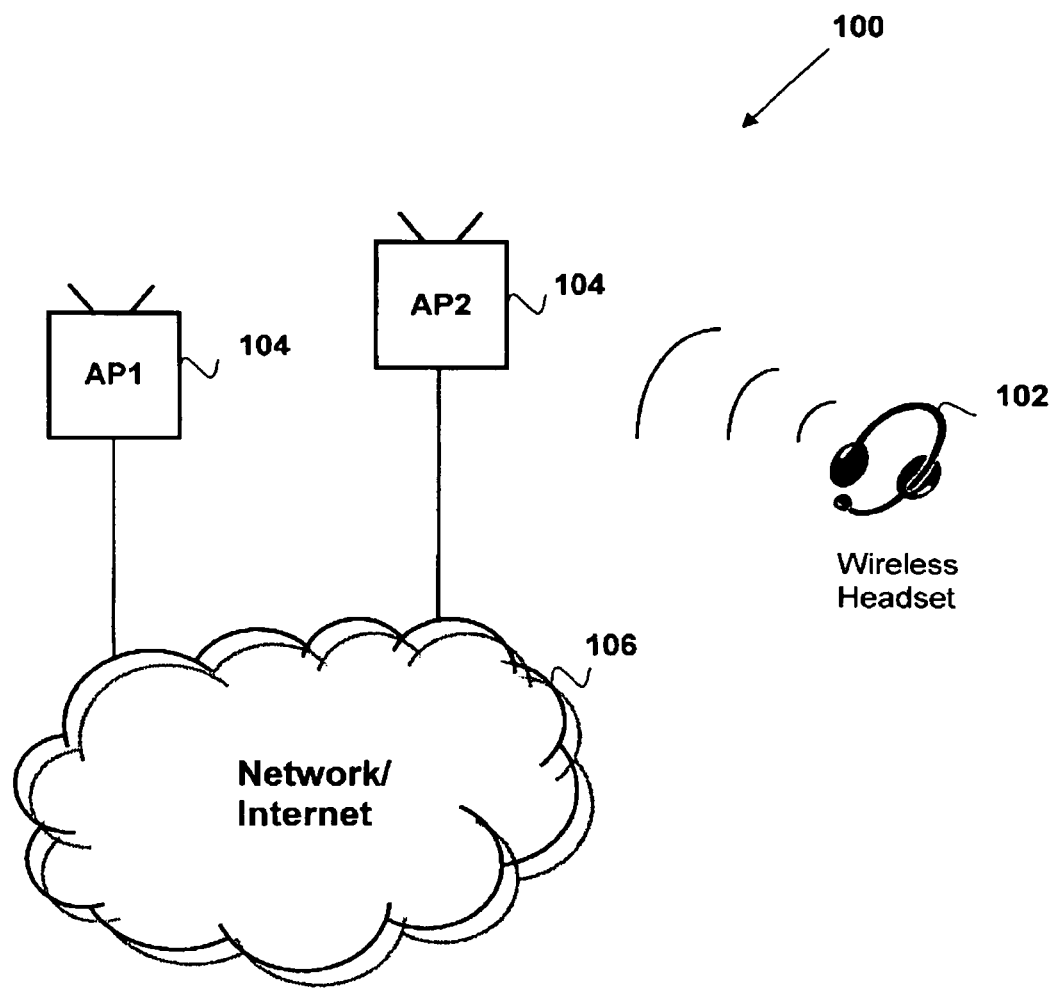
FIG. 1 shows a system including a wireless headset for accessing an access point to automatically connect to a VoIP gateway in accordance with an embodiment of the present invention.

Referring now to FIG. 1, a system 100 is illustrated in accordance with an embodiment of the present invention. System 100 includes a wireless headset 102, access points (APs) 104, and a network 106 operably coupled to APs 104. In accordance with an embodiment of the present invention, APs 104 each include a transceiver and a processor configured to allow a wireless device (e.g., a headset) access to network 106 connected to the access point (e.g., via a 10/100 Ethernet RJ-45 port) after receiving access information from the wireless device.

Figure 2:
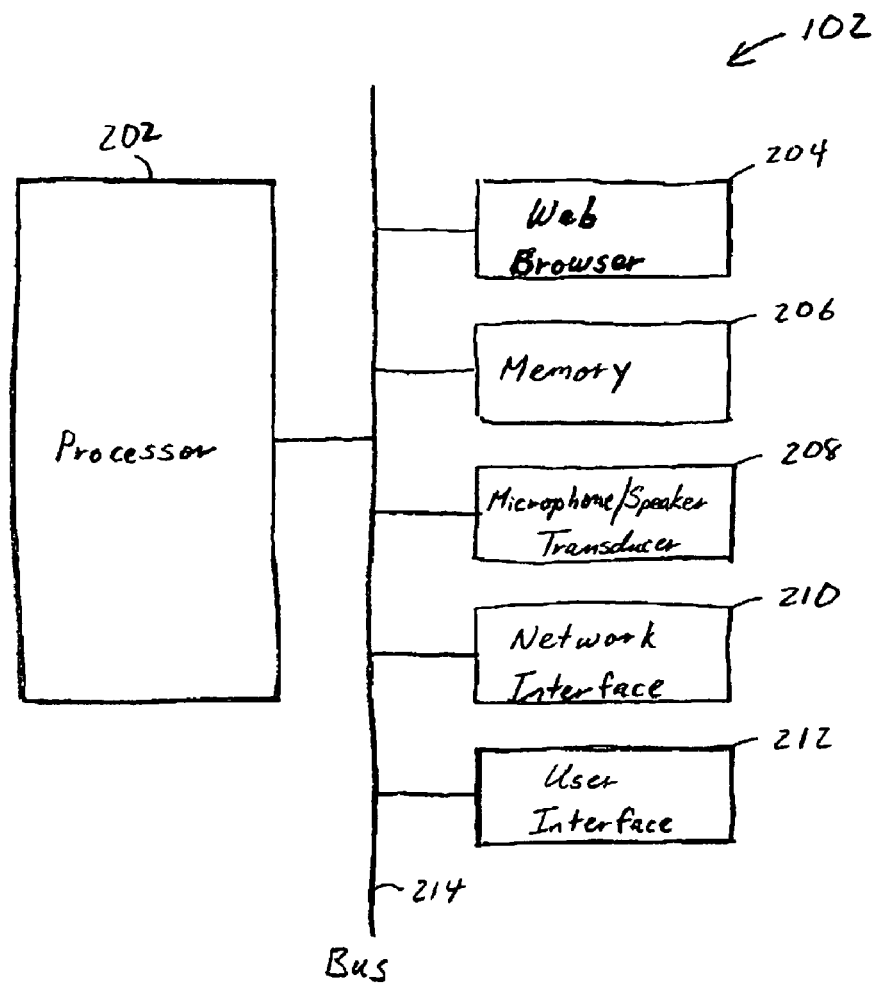
FIG. 2 shows a wireless headset for automatic configuration and connection to a VoIP service provider in accordance with another embodiment of the present invention.

Referring now to FIG. 2 in conjunction with FIG. 1, an example of a wireless headset 102 is shown in accordance with an embodiment of the present invention. Wireless headset 102 includes a processor 202 operably coupled via a bus 214 to a Web browser 204, a memory 206, a transducer 208, a network interface 210, and a user interface 212.

Processor 202 allows for processing data, in particular information about access points, VoIP service providers, and VoIP service accounts. Processor 202 is a high performance, highly integrated, and highly flexible system-on-chip (SOC) in one example, including signal processing functionality such as echo cancellation/reduction and gain control in another example. Processor 202 may include a variety of processors (e.g., digital signal processors), conventional CPUs being applicable and commercially available.

Web browser 204 is capable of browsing Web pages over network 106, and in particular VoIP service provider Web pages. In one example, Web browser 204 is a standard Hyper-Text Markup Language (HTML) or Extensible Markup Language (XML) based Web browser, the Web browser interface being standardized according to the Internet Engineering Task Force (IETF) standards for HTML and XML.

Memory 206 may include a variety of memories, and in one example includes SDRM, ROM, flash memory, or a combination thereof. Memory 206 may further include separate memory structures or a single integrated memory structure. In one example, memory 206 may be used to store passwords, network and telecommunications programs, and/or an operating system (OS). In one embodiment, memory 206 includes AP/hotspot information, VoIP service provider information, and VoIP account information. In one example, the AP/hotspot information may include the following: 1) a list of hotspot service providers; 2) hotspot SSIDs; 3) location of hotspots; 4) method of authentication; 5) login information, e.g., user name, password; and 6) security information, e.g., WEP key, WPA password. In another example, the VoIP service provider information may include a list of service providers with provider identification and Web address. In yet another example, VoIP account information may include a list of accounts with account identification, user name, and password. This information may be stored in a database in one example. Optionally, other parameters, such as quality of service or security requirements may be included.

Network interface 210 allows for communications with APs 104, and in one example includes a transceiver for communicating with a wireless local area network (LAN) radio transceiver (e.g., wireless fidelity (WiFi), Bluetooth, ultra wideband (UWB) radio, etc.) for access to a network (e.g., a wireless LAN or the Internet). Network interface 210 is adapted to derive a network address for the headset using the headset's electronic serial number, which is used to identify the headset on the network. In one embodiment, the electronic serial number may be the headset's Media Access Control (MAC) address; however, the electronic serial number may be any number that is mappable to a network address. Network interface 210 is adapted to communicate over network 106 using the network address that it derives for the headset. In one embodiment, network interface 210 is able to transmit and receive digital and/or analog signals, and in one example communicates over network 106 using IP, wherein the network interface uses a globally unique address as its IP address or is served a temporary IP address from the AP using a standard protocol, such as DHCP. In particular, network interface 210 may be operably coupled to network 106 via the IEEE 802.11 protocol. However, the network interface 210 may communicate using any of various protocols known in the art for wireless connectivity or their future enhancements. An example of an applicable network interface is described in pending U.S. patent application Ser. No. 10/091,905 filed Mar. 4, 2002, the full disclosure of which is hereby incorporated by reference for all purposes.

The definition of the Internet consists of a set of protocol layers, roughly following the ISO seven-layer Open Systems Interconnect (OSI) Reference Model (OSI/RM), as per ISO/IEC 7498-1: 1994. The layers (and other protocols) of interest for the present invention are disclosed in previously noted U.S. patent application Ser. No. 10/091,905 filed Mar. 4, 2002, the full disclosure of which was incorporated by reference for all purposes. The layers of interest are as follows: 1) OSI Layer Protocol Standard 2) Physical Layer 10/100 BaseT IEEE 802.3; 3) Data Link Layer CSMA/CD & IEEE 802.3 & IEEE 802.2 LLC; 4) Network Layer IPv4, IPv6 IETF RFC791, RFC2460; 5) Transport Layer UDP, TCP, FTP IETF RFC768, RFC793, RFC959; 6) Session Layer RTP IETF RFC1889, RFC1890; and 7) Presentation Layer VoIP ITU-T Rec. H.323

At the Physical Layer, the most common interconnect used for Internet communications is the Ethernet standard, using either 10 BaseT (10 Mbps signaling) or 100 BaseT (100 Mbps), as per IEEE 802.3. Indeed, a standard cable modem or DSL modem used for Internet access connects to the computer via either a 10 BaseT or 100 BaseT interface. These interfaces use the ubiquitous RJ-45 connector with twisted pair cable. A new version of the Ethernet standard is available that supports 1,000 Mbps, and there are plans for a 10,000 Mbps version. Similarly, wireless versions, as per IEEE 802.11, IEEE 802.15, and IEEE 802.16, are either available or planned.

At the Data Link Layer, the Ethernet standard uses Carrier Sense Multiple Access with Collision Detect (CSMA/CD), as per IEEE 802.3. With CSMA/CD, when an interface wishes to transmit a packet, it listens on the network to see if something else is transmitting (Carrier Sense). When it detects that the network is quiet, it begins to transmit the packet. To guard against two devices beginning to transmit at the same time, the interface listens to the network while it is transmitting. If the interface detects an interfering signal on the network, it stops the transmission and waits a random number of milliseconds before attempting to retransmit (Collision Detect). A variation, called CSMA/CA (Collision Avoidance), is used for wireless local area networks, as described in IEEE 802.11.

At the Network Layer, the Internet Protocols provide the packet addressing and routing information to ensure that the packet can reach the destination through the Internet. There are two versions of the Internet Protocol, known as IPv4 and IPv6, for version 4 and version 6 respectively. The main difference between these two versions is the Internet address space. IPv4 uses 32-bit addresses, and IPv6 uses 128-bit addresses; therefore, the IPv4 address space is a subset of the much larger IPv6 address space. The change from IPv4 to IPv6 was required because every device in the Internet requires a unique IP address, and the explosion in popularity of the Internet would exhaust the supply of available 32-bit addresses.

At the Transport Layer, the control stream may use either UDP datagrams or TCP connections. User Datagram Protocol (UDP) is a one-way protocol, sending "datagrams" in one direction. The protocol itself does not maintain any form of connectivity with the destination device, nor does it necessarily expect any kind of response from the destination device. Transmission Control Protocol (TCP) establishes a virtual "connection" over the Internet with the destination device. TCP maintains this connection by occasionally polling whether the other device is still available. TCP also expects a reply for every packet it sends to the destination device, which serves as a confirmation of receipt. If such a reply is not received within a certain amount of time, the packet is resent.

For VoIP applications, there are several separate data streams: the video and audio data streams and the control streams. VoIP applications normally use UDP datagrams for the video and audio streams because they require less processing overhead and because the delays involved in retransmitting a lost packet, as with TCP, are too long for two-way telephony applications. If a UDP packet is lost, then the receive device recovers the best it can, perhaps invoking some type of best guess image or acoustic reconstruction strategy.

At the Session Layer, VoIP applications normally use the Real-Time Protocol (RTP) for the delivery of the video and audio information. RTP is based on UDP datagrams for the reasons mentioned above.

A variant of the protocols at the Network Layer, Transport Layer, and Session Layer is the Robust Header Compression (RHC) method, described in IETF RFC 3095. In this variant, the IP, UDP, and RTP protocol headers are combined and compressed to reduce the header overhead to the data packets used to convey the audio telephony information.

At the Presentation Layer, the VoIP protocols specified in ITU-T Recommendation H.323 may be used to encode and decode the video and audio signals associated with the session in one example.

User interface 212 notifies the headset user of the status of the headset, and in one example includes an audio and/or visual interface such that a prompt may be provided to the user's ear and/or an LED may be lit (e.g., green when ready or red when not connected) when the headset is fully configured to initiate or receive VoIP calls.

Figure 3:
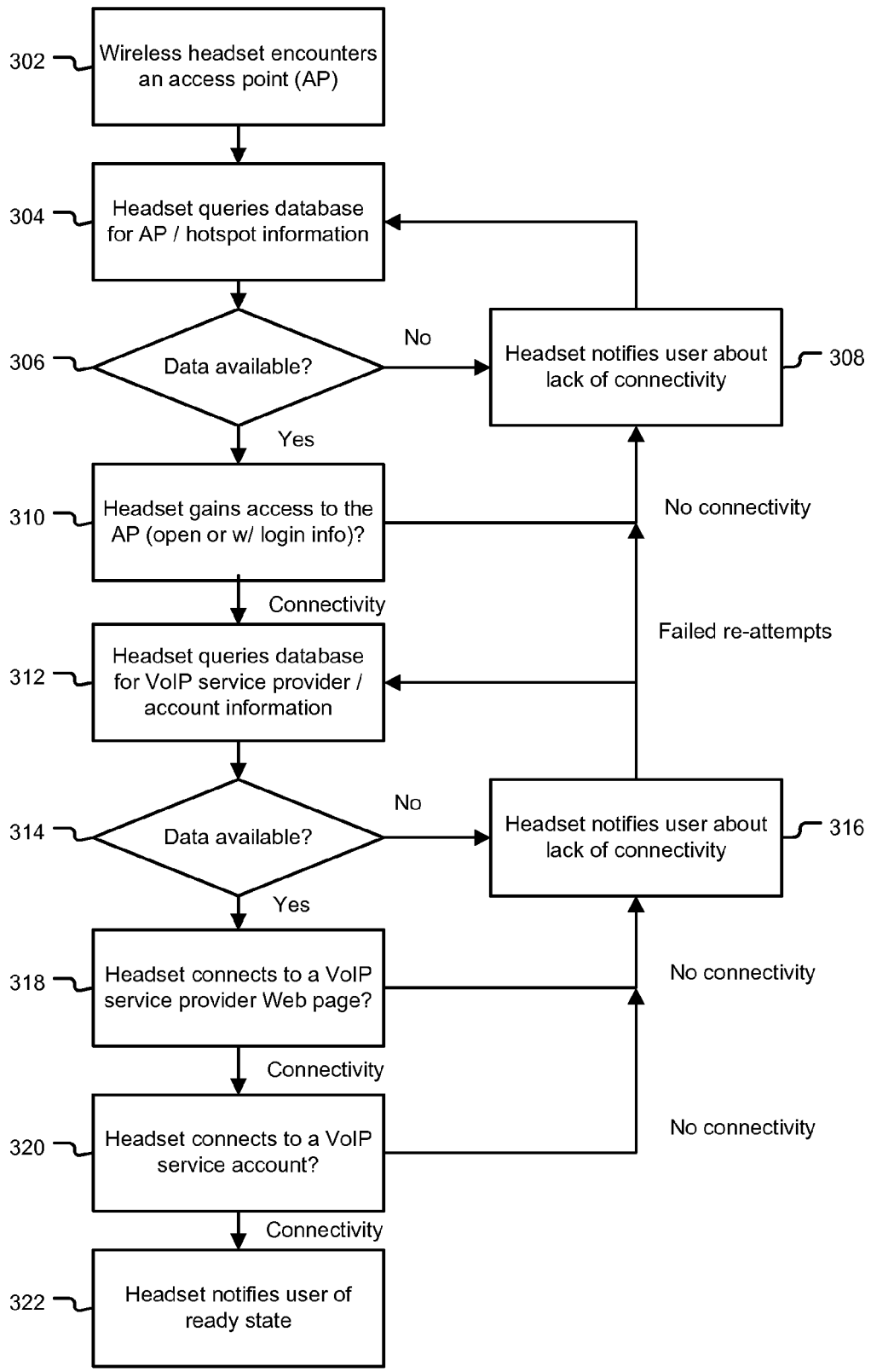
FIG. 3 shows a flowchart of a method for automatic configuration and connection to a VoIP service provider in accordance with an embodiment of the present invention.

Referring now to FIG. 3 in conjunction with FIGS. 1 and 2, a flowchart of a method of provisioning hotspot/AP information, VoIP service provider information, and VoIP service account information using system 100 is illustrated in accordance with an embodiment of the present invention.

At step 302, wireless headset 102 encounters an active hotspot via AP 104, either by scanning frequencies for 802.11 beacons or by probing on specific channels. Other triggering mechanisms are within the scope of the present invention, such as a user pressed key or time schedule.

At step 304, headset 104 queries for AP/hotspot information (e.g., a database) in memory 206.

At step 306, headset 102 matches the login screen of AP 104 against the various accounts that the headset has stored in memory 206, and a determination is made whether data regarding the detected AP is available. If data is available (headset finds a match with one of the preconfigured hotspot provider accounts), the processor 202 responds with information on the AP including credentials, etc. Headset 102 may then use the AP/hotspot information to attempt to associate and gain access to the detected AP of interest. If data is available, the process continues to step 310. If data is not available (no match is found), the process continues to step 308.

At step 308, headset 102 optionally notifies the user about the lack of connectivity via user interface 212. In one example, the notification may be audio and/or visual in nature (e.g., a prompt in the user's ear and/or an LED being activated). Headset 102 may then go back to step 304 to search for or use additional or other AP/hotspot information to re-attempt AP access.

At step 310, headset 102 attempts to access AP 104 by providing the stored AP/hotspot information to the various login fields. If the AP is accessed (connectivity when the AP is either open or the after the headset provides the stored AP/hotspot information to the various login fields), the headset and Web browser 204 have connectivity to network 106, such as the Internet, and the process continues to step 312. If the AP is not accessed with the provided information (no connectivity), the process continues to step 308.

At step 312, headset 102 then queries for VoIP service provider information and VoIP account information (e.g., from a database) in memory 206.

At step 314, if data is available, the process continues to step 318. If either data is not available or the Web page is not available after an attempt or number of attempts with the provided information, the process continues to step 316.

At step 316, headset 102 optionally notifies the user about the lack of connectivity via user interface 212. The notification may be audio and/or visual in nature in one example (e.g., a prompt in the user's ear and/or an LED being activated). Headset 102 may then go back to step 312 to search for or use additional or other VoIP service provider/account information to re-attempt service provider Web page access. After failed re-attempts, the process may move to step 308 and 304 to search for additional or other AP/hotspot information.

At step 318, headset 102 attempts to connect to a VoIP service provider Web page via Web browser 204 using the VoIP service provider information such as service provider identification and Web address. If the Web page is not available (no connectivity), the process moves to step 316.

At step 320, headset 102 attempts to access a VoIP account via the service provider Web page using the VoIP account information. If the account is not available (no connectivity), the process moves to step 316.

At step 322, headset 102 notifies the user via user interface 212 signaling that the headset is ready to initiate and receive VoIP calls. Notification may be audio and/or visual in one example as described above.

Advantageously, the present invention permits a wireless headset to automatically connect and configure itself to a VoIP gateway whenever it detects either an open AP or an AP with a hotspot service provider that it recognizes. Thus, the present invention provides for a wireless VoIP headset to be connected and available to make and receive calls without manual intervention by the user or the use of a separate device to manage the connection setup.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A Voice over Internet Protocol (VoIP) headset, comprising:
    a network interface for wirelessly communicating with an access point supporting a local area network (LAN);
    a memory for storing access point information, VoIP service provider information, and VoIP account information; and
    a World Wide Web (Web) access module for automatically accessing a VoIP account via the access point and a VoIP service provider Web page to automatically place the VoIP headset in a ready state to initiate or receive VoIP calls.

2. The headset of claim 1, wherein the network interface supports the 802.11a, 802.11b, and/or 802.11g wireless networking standards.

3. The headset of claim 1, wherein the network interface supports one of WiFi, Bluetooth, and ultra wideband (UWB).

4. The headset of claim 1, wherein the network interface is capable of transmitting the access point information to the access point to gain access to the LAN.

5. The headset of claim 1, wherein the LAN allows for connectivity to the Internet.

6. The headset of claim 1, wherein the access point information is selected from the group consisting of a hotspot SSID, location of an access point, location of a hotspot, method of authentication, login information, and security information.

7. The headset of claim 1, wherein the VoIP service provider information is selected from the group consisting of a service provider identification, and a Web address.

8. The headset of claim 1, wherein the VoIP account information is selected from the group consisting of a user name, a user password, and a VoIP account identification.

9. The headset of claim 1, further comprising a user interface for notifying the headset user when the VoIP account has been successfully or unsuccessfully accessed, thereby signaling a ready state of the headset.

10. The headset of claim 9, wherein the user interface is selected from the group consisting of a light emitting diode, and an acoustic transducer.

11. A Voice over Internet Protocol (VoIP) headset, comprising:
    a network interface for wirelessly communicating with an access point (AP) supporting a local area network (LAN) allowing for connectivity to the Internet;
    a first memory for storing AP information including login information;
    a second memory for storing VoIP service provider information including service provider World Wide Web (Web) address;
    a third memory for storing VoIP account information including a VoIP account identification and a password; and
    a Web access module for automatically accessing a VoIP account via the access point and a VoIP service provider Web page to automatically place the VoIP headset in a ready state to initiate or receive VoIP calls.

12. The headset of claim 11, wherein the network interface supports the 802.11a, 802.11b, and/or 802.11g wireless networking standards.

13. The headset of claim 11, wherein the first memory, the second memory, and the third memory are a single structure or separate structures.

14. The headset of claim 11, further comprising a user interface for notifying the headset user when the VoIP account has been successfully or unsuccessfully accessed, thereby signaling a ready state of the headset.

15. The headset of claim 14, wherein the user interface is selected from the group consisting of a light emitting diode, and an acoustic transducer.

16. A method of automatically provisioning Voice over Internet Protocol (VoIP) account information to configure a wireless VoIP headset for use, the method comprising:
    providing a wireless headset including:
        a network interface for communicating with an access point (AP) supporting a local area network (LAN),
        a memory for storing access point information, VoIP service provider information, and VoIP account information, and
        a World Wide Web (Web) access module;
    connecting to the AP using the access point information;
    connecting to a VoIP service provider Web page via the Web access module using the VoIP service provider information;
    and automatically accessing a VoIP account via the VoIP service provider Web page using the VoIP account information to automatically place the VoIP headset in a ready state to initiate or receive VoIP calls.

17. The method of claim 16, wherein the access point information is selected from the group consisting of preferred hotspot SSIDs, prioritized hotspot list, location of access points, location of hotspots, method of authentication, login information, and security information.

18. The method of claim 16, wherein the VoIP service provider information is selected from the group consisting of a service provider identification, and a Web address.

19. The method of claim 16, wherein the VoIP account information is selected from the group consisting of a user name, a user password, and a VoIP account identification.

20. The method of claim 16, further comprising notifying the headset user when the VoIP account has been successfully accessed, thereby signaling a ready state of the headset.

* * * * *

Disclaimer

8,073,152 B1 — Edward L. Reuss, Santa Cruz, CA (US). AUTOMATED VOICE OVER INTERNET PROTOCOL WIRELESS HEADSET. Patent dated December 6, 2011. Disclaimer filed July 21, 2014, by the assignee, Plantronics, Inc.

Hereby disclaims term of this patent which shall not extend beyond the expiration date of Patent No. 7,738,434.

(*Official Gazette, October 21, 2014*)